UNITED STATES PATENT OFFICE.

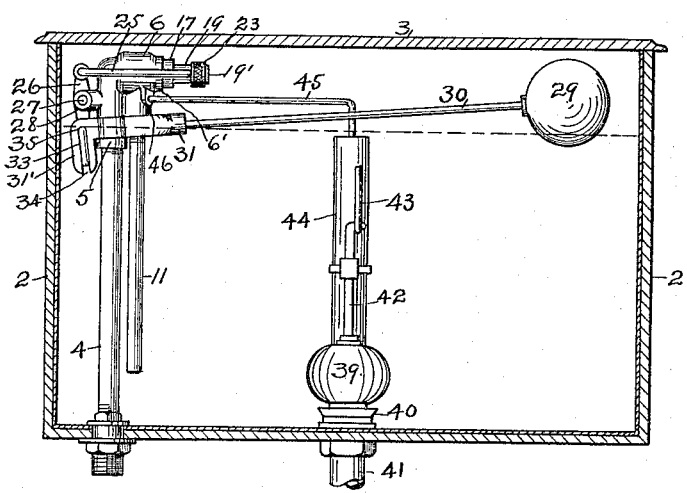

TILGHMAN J. FLOREY, OF WASHINGTON, NEW JERSEY, ASSIGNOR TO AMERICAN SANITARY WORKS, OF NEW YORK, N. Y., A CORPORATION OF NEW JERSEY.

BALL-COCK.

1,148,835.      Specification of Letters Patent.      Patented Aug. 3, 1915.

Application filed November 17, 1914. Serial No. 872,640.

*To all whom it may concern:*

Be it known that I, TILGHMAN J. FLOREY, a citizen of the United States, residing at Washington, in the county of Warren and State of New Jersey, have invented certain new and useful Improvements in Ball-Cocks, of which the following is a specification.

This invention relates to ball-cocks, designed particularly for use in connection with "low-down" flush tanks, and has for its object to provide, a novel, simple and convenient valve or cock to be located at or near the top of the flush tank, preferably above the water level when the tank is full, where it is conveniently accessible for cleaning, repairing, and packing.

A further object is to provide means for rendering the ball-cock noiseless during the final closing movement. And a further object is to provide a ball-cock of the class which may be readily and quickly repaired, cleaned and repacked by any unskilled person.

The various features and parts of the invention will be understood from the detailed description which follows, and by reference to the accompanying drawing, in which—

Figure 1 is a view of a flush tank, to which my improvement is applied. Fig. 2 is a front end view of the ball-cock. Fig. 3 is a central vertical cross-section, taken on line 3—3 of Fig. 2; showing the construction and arrangement of the device, the valve being closed. Fig. 4 is a part elevation and part section; showing the valve open for filling the flush tank. Fig. 5 is a top-plan view of the device, shown in Figs. 1, 2 and 3. Fig. 6 is an enlarged view of the valve bushing. Fig. 7 is an enlarged view of the valve. Figs. 8 and 9 are respectively a plan view and an edge view of the removable valve seat. Fig. 10 is a sectional view; showing the valve seat integral with the casing.

Heretofore, the ball-cocks, or water-inlet valves, of the well-known low-down flush tanks have been located on or near the bottoms of the tanks where they are invariably submerged, and owing to the depth and narrowness of this class of tanks, these cocks or valves are almost inaccessible for repacking, repairing and removal. The present invention comprises an elevated ball-cock or valve, of peculiar and novel construction, which is disposed at or near the top of the tank, and preferably above the highest level of the water, where it may be readily seen and easily reached, as indicated by the full and dotted lines in Fig. 1.

In the drawing, 2 represents a flush tank of the "low-down" type, which is generally located near the closet bowl (not shown), and 3 represents the cover of the tank. The water used for flushing the closet bowl is supplied to the tank 2 by an inlet-pipe 4, which pierces the bottom of the tank, its lower end being threaded for connecting with the source of water in the usual manner. The pipe 4 passes upwardly inside the tank to a point near the top, and its upper end is screwed into a depending leg or part 5 of the cock or valve body 6, in which is an inlet chamber 7.

8 represents another chamber which connects with chamber 7 by a port 9, and 10 represents a passage extending downwardly from the outlet chamber 8, parallel to the passage 7, and into the lower end of which is screwed an outlet or discharge pipe 11, the latter extending alongside the pipe 4 to a point near the bottom of the tank 2.

12 represents a circular removable valve seat which is disposed in the chamber 8 concentric to the port 9, and has a hollow hub 13 which projects into the said port, while the flange-portion 14 engages a packing-ring 15, which surrounds the port 9, and prevents leakage around the said removable seat. The opposite face of the seat 12 is provided with a similar hub 16, which faces the valve chamber 8. The seat 12 is held in place by a concentric bushing 17, the latter being externally threaded at one end for screwing into a neck 6' of the body 6, which communicates with the valve chamber 8, while the opposite end 17' is a plain cylinder and engages the flange 14 of the seat. The plain portion 17' of the bushing is counterbored to provide a valve-chamber 18 slightly larger in diameter than the plunger, and this portion has a number of perforations, as at 18', to allow the water flowing through the disk 12 to pass into the chamber 8 which surrounds the bushing, and thence into the discharge pipe 11.

The valve or cock consists of a solid cylindrical body or part 19 which reciprocates in the bushing 17. The inner end of the cylinder or plunger 19 is formed into a head 20, comprising the valve proper, and this head is counterbored to receive a rubber or other compressible packing 21, which engages the hub 16 of the seat (see Fig. 3) and prevents the passage of the water from chamber 7 to chamber 8. Intermediate its ends, the valve or plunger 19 has an annular groove, in which is disposed a suitable packing ring, 22, for preventing the leakage of the water between the plunger and the bushing 17. The outer end 19′ of the plunger 19 is threaded and fitted with a nut or collar 23, and near the said end the plunger is provided with an L-shaped slot or groove 24, which is partially closed by the said nut, when the latter is screwed on to the extent shown in Figs. 1, 3 and 4. The plunger 19 is operatively held in the bushing or thimble 17 by a link or loop 25, one end of which is disposed in the slot 24 in the outer end 19′ and is held therein by the nut 23. The other end of the link is pivoted in the upper end of a rocking lever or beam 26. The lever 26 is pivoted intermediate its ends by a pin 27, between lugs 28 which project laterally from the body 6. The rocking of the lever 26 toward and away from the body 6 through the link 25, reciprocates the plunger 19 in the bushing 17, and opens and closes the passage through the seat 12 (see Figs. 3 and 4). The operation of the cock or valve plunger 19 is entirely automatic, and it is controlled by a float 29, which is raised by the water during the filling of the tank, for closing the valve or cock when the proper level is reached, and which gravitates with the receding water during the flushing operation, for opening the valve or cock, in the usual way. The float 29 is supported by a rod 30, which in turn is supported by a yoke 31, the latter being pivotally supported by lugs 32 projecting from the leg 5, by a link-like part 33. The arms 31′ of the yoke pass by the opposite sides of the pipes 4 and 11, and are bent downwardly at right angles to the body, of the yoke, and their tips or ends are notched at 34 to receive the wire-link 33. The ends of the wire 33 pass through perforations 35 in the arms 31′, and then enter and rock in upwardly facing slots 36 in the lugs 32 (see Figs. 2, 3, 4 and 5). The lower end of the lever or beam 26 is disposed between the arms 31′ of the yoke and it is also slotted at 37 to receive the link 33 (see Figs. 2, 3 and 4). The upward and downward movements of the yoke 31 cause the link 33 to rock the lever 26 for reciprocating the plunger 19, as best seen in Figs. 3 and 4.

Owing to the peculiar and novel construction and arrangement of the plunger operating parts including the lever 26, float 29, rod 30, and the yoke 31, an extremely powerful leverage is provided to overcome the normal pressure of the water supplied to the tank, as well as, the back pressure or resistance offered by the water confined in the chamber 18 during the final closing movement of the plunger-valve.

Practically all of the older styles or makes of ball-cocks employed in flush tanks, produce a whistling, rumbling or grating noise during the final closing movements, which can be heard for a considerable distance. This is due in part to the fact that the water in the valve chambers is allowed to escape therefrom freely during the final closing movement of the valves.

It is an object of the present invention to provide means for silencing the cock and thus obviating these disturbing noises. To this end, the perforations or ports 18′ of the bushing 17 are so disposed that the head or valve 20 partially closes the said perforations in advance of its final closing movement. And in this way entraps a certain amount of the water in the chamber 18 which has no ready means of escape. Then as the part 20 of the plunger continues its movement toward the seat 16, the water ahead of the plunger, including the water in the space 14′, forms a slight back-pressure or cushion against the plunger, and the final closing movement is thus accomplished in a steady and silent manner, by the powerful leverage exerted by the float and the intervening connections which control the plunger. The partial closing of the ports 18′ permits the water confined ahead of the plunger to be gradually and silently displaced until the head 20 comes in contact with the seat 16. Fig. 10 shows the valve seat 12′ formed integrally with the casing 6, the said seat being concentric to the port 9′, and projecting into the bushing 17′ for providing a similar water space 14″ for resisting the plunger, as described.

To remove the plunger 19 for repacking or otherwise repairing or cleaning the cock, the water supply is first shut off. The nut 23 should be then unscrewed sufficiently to allow the link 25 to be released from the notch 24 and swung upwardly, as shown by the dotted lines in Fig. 4. The valve-plunger 19 may then be withdrawn from the bushing 17, and a new packing 21 applied. To remove the seat 12, the bushing 17 must first be unscrewed. This may be accomplished with a spanner wrench or other instrument which may be applied to the notches 38 formed in the threaded end of the bushing. After the bushing is removed, the valve seat 12 may be withdrawn through the neck 6′. By the provision of the link 25, the plunger 19 and seat 12 may be readily and quickly removed and repaired by any unskilled person, without the use of any tools, and without interference by the water in the tank.

The flushing of the closet is accomplished by a valve 39, which rests upon a seat 40 located on the bottom of the tank 2, and a pipe 41 leads from the seat to the closet bowl (not shown). The valve 39 is operated by means of rods 42 and 43 which are supported by the overflow pipe 44. The partial refilling of the closet bowl after each flushing is effected by a small pipe 45, one end of which screws into a port 46 leading to the passage 10, while the other end of said pipe is inserted into the upper end of the overflow pipe 44.

My improved ball-cock is extremely simple in construction and effective in operation. The disposition of the cock at the top of the flush tank above and clear of the water when the tank is filled, the employment of the repair-link 25 for detachably holding the plunger-valve in place, as well as for reciprocating the plunger, together with the provision of the rocking lever 26 and the yoke 31 for actuating the link, and the means for rendering the cock noiseless, produces a combination which is novel and which is not possessed by any other device of the class known to me.

It is obvious that some changes or modifications may be made in the parts of the device, within the scope defined by the appended claims without departing from the spirit of the invention.

Having thus described my invention, what I claim as new, and desire to secure by Letters Patent, is—

1. An elevated-cock for flush tanks, including a casing provided with inlet and outlet chambers connected by a port, a removable seat in said port, a cylinder reciprocatable in the outlet chamber, one end of said cylinder having a valve-head for engaging said seat, the other end of said cylinder having a slot, a link for reciprocating said cylinder, one end of said link disposed in said slot, a rocking lever one end of said lever connecting to said link, a yoke adapted to support a float, and a second link pivotally connecting said yoke with the opposite end of said rocking lever.

2. The combination with a hollow body having inlet and outlet chambers connected by a port, and a reciprocatable plunger having at one end a valve-head for opening and closing said port, the opposite end of said plunger extending beyond the body and having a slot, of a valve operating mechanism comprising a loop, one end of said loop engaging the slot in said plunger, a nut screwed on the plunger for holding the loop in said slot, a rocking lever, one end of said lever connected to the opposite end of said loop, a yoke straddling said body adapted to support a float, and a second link connecting said yoke with the opposite end of said lever.

3. A ball-cock, including a body having inlet and outlet chambers connected by a port, a bushing telescoping said body concentric to said port, a plunger telescoping said bushing, the inner end of said plunger having a valve-head for closing said port, the outer end of said plunger being threaded and provided with an L-shaped slot, a rocking lever pivoted to said body, a link for reciprocating said plunger, one end of said link disposed in said slot, the opposite end of said link connected to said lever, a yoke pivoted to said body, a link connecting said yoke to said lever and forming the pivot of said yoke, and a float connected to and operating said yoke.

4. A ball cock having in combination a hollow body provided with an inlet and an outlet chamber connected by a port, a pipe for supplying water to the inlet chamber, a pipe for draining said outlet chamber, a valve seat disposed concentric to said port having a hub projecting into the outlet chamber, a cylindrical bushing screwed into said body concentric to and engaging said seat, a plunger reciprocatable in said bushing having at one end a valve-disk for closing the passage through said seat, the opposite end of said plunger being threaded and having a notch, a rocking lever pivoted to said body, a link, one end of said link disposed in the notch in said plunger, the other end thereof connected to said rocking-lever, and a nut for holding said link in said notch.

In testimony whereof I affix my signature in presence of two witnesses.

TILGHMAN J. FLOREY.

Witnesses:
AMRI W. ALLEGAN,
GEORGE MORRIS.

Copies of this patent may be obtained for five cents each, by addressing the "Commissioner of Patents, Washington, D. C."